United States Patent
Melvin

(10) Patent No.: US 9,339,051 B2
(45) Date of Patent: May 17, 2016

(54) ALCOHOL CONTAINING FROZEN DESSERT PRODUCT

(75) Inventor: David Hart Melvin, Toronto (CA)

(73) Assignee: GELATO FRESCO, INC., Toronto, Ontario (CA)

( * ) Notice: Subject to any disclaimer, the term of this patent is extended or adjusted under 35 U.S.C. 154(b) by 478 days.

(21) Appl. No.: 13/136,747

(22) Filed: Aug. 9, 2011

(65) Prior Publication Data

US 2012/0128854 A1    May 24, 2012

Related U.S. Application Data

(60) Provisional application No. 61/401,278, filed on Aug. 10, 2010.

(51) Int. Cl.
*A23G 9/32* (2006.01)

(52) U.S. Cl.
CPC .......................................... *A23G 9/32* (2013.01)

(58) Field of Classification Search
USPC .......................................... 426/565, 660, 524
See application file for complete search history.

(56) References Cited

U.S. PATENT DOCUMENTS 5,084,295 A * 1/1992 Whelan et al. ................. 426/565
2003/0215548 A1* 11/2003 Mihajlovic .................... 426/101

FOREIGN PATENT DOCUMENTS

WO    WO00/30468    * 6/2000 ............... A23G 9/00

OTHER PUBLICATIONS

Farmer's Nest "Soda Pop Ice Cream", pp. 1-2 Jul. 12, 2010 http://www.thefarmersnest.com/2010/07/soda-pop-icecream.html.*
Butler "Orange Soda Ice Cream", pp. 1-3, Jul. 12, 2007 http://www.food.com/recipe/orange-soda-ice-cream-electric-ice-cream-maker-240036.*
Arbuckle Ice Cream 2nd Edition AVI Publishing 1972, pp. 39 and 41.*
GMO "Mono and diglycerides" Jul. 5, 2009, pp. 1-2 http://www.gmo-compass.org/eng/database/e-numbers/159.mono_diglycerides.html.*

* cited by examiner

*Primary Examiner* — Kelly Bekker
(74) *Attorney, Agent, or Firm* — Thomas A. O'Rourke; Bodner & O'Rourke, LLP

(57) ABSTRACT

The present invention is directed to an alcohol containing bulk frozen dessert product that is formed by adding an alcohol containing composition to a frozen dessert product premix after the premix has been pasteurized. The alcohol containing composition is comprised of an alcohol, a water based mixer, and a stabilizer and/or emulsifier. The alcohol containing bulk frozen dessert product may have an alcohol content from about 2% to about 18% and will be able to be stored and consumed at temperatures for traditional bulk frozen dessert products.

26 Claims, 1 Drawing Sheet

| g Sucrose/100 g water | FPD (°C) | g Sucrose/100 g water | FPD (°C) | g Sucrose/100 g water | FPD (°C) |
| --- | --- | --- | --- | --- | --- |
| 3 | 0.18 | 63 | 4.10 | 123 | 9.19 |
| 6 | 0.35 | 66 | 4.33 | 126 | 9.45 |
| 9 | 0.53 | 69 | 4.54 | 129 | 9.71 |
| 12 | 0.72 | 72 | 4.77 | 132 | 9.96 |
| 15 | 0.90 | 75 | 5.00 | 135 | 10.22 |
| 18 | 1.10 | 78 | 5.26 | 138 | 10.47 |
| 21 | 1.29 | 81 | 5.53 | 141 | 10.72 |
| 24 | 1.47 | 84 | 5.77 | 144 | 10.97 |
| 27 | 1.67 | 87 | 5.99 | 147 | 11.19 |
| 30 | 1.86 | 90 | 6.23 | 150 | 11.41 |
| 33 | 2.03 | 93 | 6.50 | 153 | 11.63 |
| 36 | 2.21 | 96 | 6.80 | 156 | 11.88 |
| 39 | 2.40 | 99 | 7.04 | 159 | 12.14 |
| 42 | 2.60 | 102 | 7.32 | 162 | 12.40 |
| 45 | 2.78 | 105 | 7.56 | 165 | 12.67 |
| 48 | 2.99 | 108 | 7.80 | 168 | 12.88 |
| 51 | 3.20 | 111 | 8.04 | 171 | 13.08 |
| 54 | 3.42 | 114 | 8.33 | 174 | 13.28 |
| 57 | 3.63 | 117 | 8.62 | 177 | 13.48 |
| 60 | 3.85 | 120 | 8.92 | 180 | 13.68 |

ALCOHOL CONTAINING FROZEN DESSERT PRODUCT

This application claims priority on U.S. Provisional patent application Ser. No. 61/401,278 filed Aug. 10, 2010 the disclosures of which are in corporate by reference.

FIELD OF THE INVENTION

The present invention relates to frozen dessert products and more particularly, alcohol containing bulk frozen dessert products that can be stored and consumed at traditional frozen dessert product temperatures.

BACKGROUND OF THE INVENTION

Frozen dessert products have been and still are one of the most popular edible consumer products. These products, such as ice cream, are typically comprised of a mixture of air, water, milkfat, nonfat milk solids ("NMS"), sugar, stabilizers, emulsifiers, and flavors. An ice cream mix, for example, is the unfrozen blend of the aforementioned ingredients except the air and flavoring materials. These mix formulations are defined as percentages of the constituents, e.g., percentage of milkfat, NMS, sugar, egg yolk solids, stabilizer/emulsifier, and total solids. They can be combined in varying proportions as long as they are within acceptable ranges. For example, the milkfat content of ice cream may vary from less than 1 to 20%, depending on factors, such as regulations, expected characteristics, price, and competition.

In order to properly understand the uniqueness of the present invention, a description of the manufacture, storage, and structure of traditional bulk frozen dessert products is first provided.

Traditional bulk frozen dessert products are manufactured utilizing a liquid pre-mix. These particular pre-mixes have evolved to produce frozen products that meet the needs and demands of the market. These needs and demands are flavor and sweetness and creamy texture and the ability to be scooped and served within the temperature ranges of commercial and home freezer storage systems.

Flavors of frozen desserts range from the traditional flavors such as vanilla, chocolate and strawberry to a complex mix of different cookies and other ingredients, including different fruit and other flavors.

The market basically expects a product with a familiar level of sweetness. In a bulk product, the sweetness is partly a result of the need to add an ingredient to the pre-mix that alters the freezing point so that the desired structure and texture is obtained.

The structure is such that the served product must be soft enough so that it is consumable with a spoon or is capable of being scooped into a cone or other holder. This demands that the served product be soft enough to be eaten pleasantly at a serving temperature of around −6° C. to −14° C.

The simplified process of bulk frozen dessert manufacture is broken down into 7 steps: raw material delivery and storage, base mixing, homogenization and pasteurization, aging, flavor addition and continuous freezing, cartoning, and finally hardening.

In the initial step, after the raw materials have been delivered and stored, they are moved from the storage area into the mix preparation area where they are weighed, measured or metered and then mixed or blended. The ingredients are mixed by placing all of the liquid ingredients in a vat and then agitating and heating the mixture. Dry ingredients, if they are not liquefied first, such as nonfat dry milk ("NDM"), dry whey, dried eggs, cocoa, sugar, and stabilizer/emulsifier are added to the mixture while the liquid materials are being agitated and before the temperature of the mixture reaches 50° C. (122° F.). Added frozen products, such as butter, frozen cream, and plastic cream are generally cut into small pieces and allowed sufficient time to melt before pasteurization is started. Coloring and flavoring materials are generally added at the time the mix is frozen.

Stabilizers and emulsifiers have been taught as an important addition at the mixing stage because they help to give ice cream the smooth body and texture and help to improve the overall mouth feel of the ice cream. However, stabilizers and emulsifiers function very differently. The stabilizers have an ability to interact with water through hydration and swelling which enables them to occupy a large solution of volume and, as a result, reduce the amount of free water in the frozen dessert product mixture. This effect retards ice crystal growth during storage and also provides resistance to melting. This results in the rheological characteristics of the solutions being greatly modified. Examples of stabilizers include guar-gum, carob, alginates, and agar.

Emulsifiers, on the other hand, help to reduce fat globule coalescence by decreasing the interfacial tension between the fat and the matrix within the ice cream mixture. An emulsifier is a substance that produces a stable suspension of two liquids that do not mix naturally, for example, oil and water. They promote fat destabilization by lowering the fat/water interfacial tension in the mix, which results in protein displacement from the fat globule surface, which in turn, reduces the stability of the fat globule thereby allowing for partial coalescence during the whipping and freezing process. This leads to the formation of a structure of the fat in the frozen product that contributes a great amount to the texture and meltdown properties. Suitable emulsifiers include manufactured-mono and diglycerides, sorbitan esters and natural egg yolk.

After the ingredients have been mixed, the next step is the pasteurization of the mix in order to destroy all pathogenic microorganisms as well as most hydrolytic enzymes that could damage the flavor and texture. Proper pasteurization consists of rapidly heating the mix to a sufficient temperature, holding at that temperature for the requisite time, and then rapidly cooling to <5° C. (<41° F.). There are different methods for pasteurization that require different minimal temperatures. Different pasteurization methods include Batch type, High-Temperature Short Time, High-Heat Short Time, and Ultra High Temperature which require minimal temperatures of 69° C., 80° C., 90° C., and 138° C. respectively. Pasteurization (1) renders the mix substantially free of microorganisms by killing all of the pathogens likely to be in the ingredients, (2) brings solids into solution, (3) assists in the blending operation by melting the fat and decreasing the viscosity, (4) improves the flavor of most mixes, (5) extends the keeping quality to a few weeks, and (6) increases the uniformity of the product.

The product is then homogenized after the pasteurization process is completed. The main purpose of homogenizing the mixture is to reduce the size of fat globules to less than about 2 μm. This process is usually carried out by forcing the mix through a very small orifice under suitable conditions of pressure and temperature and using a positive displacement pump to provide the pressure. Homogenizers are piston-type pumps that move a constant amount of liquid through a very thin opening of one or two valves. As a result, fat globules, which need to be liquefied, are greatly distorted as they travel at a velocity of about 12,000 cm/s between the parallel walls of the valve and valve seat. When the average diameter of fat globules is reduced to one-half the original diameter, the number of globules increases by eight times and the total surface area is doubled. Thus, the amount of materials adsorbed increases markedly. All of the amphiphilic materials in the immediate microenvironment of the newly formed bare surface of the fat, such as proteins and emulsifiers, will adsorb rapidly to reduce the oil:water interfacial tension. Homogenization typically reduces the globule diameters by about ten times and increases the total surface area about 100 times. Protein adsorption on the outer surface of the newly formed membranes greatly increases the hydrated surface area and is believed to account for the increased smoothness of texture associated with homogenization of mixes.

Alternatively, homogenization may precede pasteurization in which case the minimum temperature of the homogenization process must be 60° C. (140° F.) if any part of the mix is composed of raw milk. At this temperature, the milk lipase is virtually inactivated to ensure that lipolysis will not take place as the protective fat globule membrane is stripped. In addition, the higher temperatures limit clumping of fat globules and reduce the energy needed to run the homogenizer.

Pasteurization and homogenization change the physical forms of the suspended solids of ice cream mixes. Homogenization reduces fat globule diameters while pasteurization melts all of the fat. New and different fat globules are formed and hydrophilic colloids are hydrated and reduced in size. After pasteurization and homogenization have been completed, the mixture is then aged by being cooled to less than 4° C. (40° F.). During this cooling stage, the fat begins to crystallize; however, the mix is not yet ready to be frozen. Rather, it is cooled for 4-24 hours in order to complete crystallization since nearly complete crystallization is needed for the fat globules to coalesce during the freezing process. To obtain substantial crystallization, emulsifiers displace proteins from the globule interface during aging. Further, the aging process also needs time because some of the hydrocolloid stabilizers require time for full hydration to provide significant increases in viscosity. Generally, 4 hours is sufficient for these changes to occur.

After aging, the mixes are then flavored and then frozen. In order to freeze the mix, the mix is put into a cylindrical freezer barrel and is chilled with a liquid refrigerant. The mix is whipped with a moving blade or paddle that is inside of the freezer barrel. The moving blade has sharp scraper edges that contact the very smooth surface of the freezing cylinder. As the blades rotate within the barrel, they scrape an ice layer off of the cylinder wall. The small ice crystals contained in the ice layer mix with the rest of the ice cream within the freezing barrel to transform the mix into a viscous, multi-phase product containing dispersed ice crystals and air cells, partially coalesced fat globules and colloidal proteins that are held together by a high viscosity solution with dissolved sugars, stabilizers, proteins and salts.

In the freezing cycle, ice crystallizes from the continuous phase, transforming it into a thick syrup. Air cells form and hydrophilic colloids adsorb to their surfaces, stabilizing them. Air cells are essential in conventional bulk ice cream products because they create overrun, which refers to the increase in volume of the ice cream over the volume of the mix used. Air cells also affect the overall taste of the ice cream, as well as scoopability. The additional considerations of taste and scoopability that air cells create in bulk ice cream products results in added production costs as well. Fat globules become increasingly crystalline, and some of them coalesce, forming structure that supports the foam. As the product exits the freezer, it has about one half of its water frozen and has expanded up to about 100% in volume. The continuous phase is a thick syrup while the air cells, ice crystals, fat globules, casein micelles, and other hydrocolloids are dispersed throughout the product. This makes ice cream a three-phase system: gaseous and solid and liquid. The agglomeration is a combination of small ice crystals and concentrated small pockets of unfrozen pre-mix and air. The concentrated pockets of premix are mostly a result of the freezing process concentrating the liquid such that its freezing point is further depressed.

The product is then removed and poured into bulk containers of the desired end size. The temperature is lowered such that the bulk product evolves to the solid frozen bulk. The product is stored at a recommended temperature of from about $-18°$ C. to about $-25°$ C., but, it can be stored at temperatures below that if the equipment is available. However, equipment to store ice cream at temperatures lower than $-25°$ C. are by their nature extremely expensive compared to conventional freezers.

When a bulk product is ready to be consumed it is warmed up such that it again becomes smooth and creamy. This enables it to be scooped into ice cream cones and cups, on pies, and in conjunction with any desired use. The ideal texture of a frozen dessert is a soft and creamy product that will stick together effectively.

At serving temperature, the product is actually only about 50% to 70% frozen. The frozen aspects of the dessert create sufficient stability such that the remainder of the mix is held in place, very much like mayonnaise holding its ingredients in a colloidal suspension. The key part of this description is that the pre-mixes utilized for regular frozen desserts are about 80% frozen at recommended serving temperatures. The serving temperature of the dessert is from about $-6°$ C. to about $-14°$ C.

These temperatures are about the average temperature of a freezer connected to a refrigerator. Longer term storage in equipment such as a deep freezer or a commercial deep freezer results in a higher percentage of the dessert being frozen resulting in the characteristic spoon bending hardness of ice cream taken from the deep freeze.

The mixture also has air trapped in its texture. This can be significant with as much if not more than 50% of the volume of the finished product is air. The air will create a certain amount of product insulation such that it will inhibit heat transfer between the bulk of the frozen dessert and the ambient environment.

One of the most important qualities of a frozen dessert product is its melting quality. The melting rate has the greatest significance to the consumer when the product is being eaten from a cone or stick. If the product melts too fast, a messy and potentially unflattering situation often results. A fast-melting product is also undesirable because it tends to become heat shocked readily. A low freezing point is the primary cause of rapid melting because the ice cream melts more rapidly at warmer temperatures. However, adjusting the concentration of ingredients to produce a slow melt can cause slow release of delicate flavors. Products that contain a high amount of air or fat tend to melt slowly since air cells act as an insulator and fat stabilizes the foam structure. Treatments that destabilize proteins cause the curdy and free whey appearance of melted ice cream.

Ice cream with desirable melting quality begins to show definite melting within 15-20 minutes of having been subjected to room temperature. The ideal melting product will flow readily and form a homogeneous fluid with the appearance of the unfrozen mix and with little foam. The freezing point of a frozen dessert product is dependent on the concentration of the soluble constituents and varies with the composition. An average mix containing 12% fat, 11% NMS, 15% sugar, 0.3% stabilizer, and 61.7% water has a freezing point of approximately −2.5° C. (27.5° F.). The freezing point of mixes having high sugar and NMS content may range downward to −3° C. (26.5° F.) while conversely, mixes with high fat, low NMS, or low sugar will tend to range upward to −1.4° C. (29.5° F.).

One of the most important considerations when producing ice cream or any other frozen dessert product is how much the freezing point will be affected by the composition of ingredients. The freezing point is dependent on the concentration of the soluble constituents and varies with the composition. An average mix containing 12% fat, 11% NMS, 15% sugar, 0.3% stabilizer, and 61.7% water has a freezing point of approximately −2.5° C. (27.5° F.). The initial freezing point of the mixture is highly dependent on the sugar content of the mix. Additional materials in the solution also affect the freezing point; however the primary freezing point altering ingredient is the sugars present. As more sugar is removed, the freezing point of the mix rises and the hardness of the product increases. The term sugar means traditional table sugar, such as sucrose, as well as the equivalent content of sucrose in the mix. The equivalent content of sucrose is referred to as the sucrose equivalence and includes all of the mono- and disaccharides that are present in the mix.

Freezing point depression is the terminology used to refer to the decreased freezing point and it represents the difference between 0° C. and the temperature at which an ice cream mix first begins to freeze. In order to calculate the freezing point depression of a mix, the sum of each of the components that impact the freezing point is needed, including the combination of sweeteners (mono and disaccharides) and milk ingredients (lactose and salts). The fat, proteins, large molecular weight carbohydrates, stabilizers and emulsifiers do not contribute to freezing point depression because fat is immiscible with the aqueous phase and proteins and polysaccharides are very large molecules. However, these substances may have an indirect affect on the concentration because their increased addition leads to a decrease in the amount of water in which solutes can dissolve.

To calculate the freezing point depression of a mix, the first step is to calculate the equivalent content of sucrose in the mix, based on all the mono- and disaccharides that are present. This is called the sucrose equivalence (SE) in g/100 g of mix:

$$SE=(NMS \times 0.545)+(WS \times 0.765)+S+(10DE\ CSS \times 0.2)+(36DE\ CSS \times 0.6)+(42DE\ CSS \times 0.8)+(62DE\ CSS \times 1.2)+(HFCS \times 1.8)+(F \times 1.9)$$

where:
NMS=nonfat milk solids, 0.545 is the percentage of lactose typical of NMS;
WS=whey solids (from dry or condensed whey), 0.765 is the percentage of lactose typically found in whey solids;
S=sucrose or other disaccharides such as lactose or maltose added directly;
DE=dextrose equivalence of the CSS (corn syrup solids);
HFCS=high fructose corn syrup;
F=pure fructose or other pure monosaccharides such as dextrose; all in g/100 g mix (or %).

The equivalent concentration of sucrose in water (g/100 g water) is then calculated by dividing the SE by the water content.

$$g\ sucrose/100\ g\ water=SE \times 100/W$$

where W is the water content (100−total solids, %).

To obtain the freezing point depression associated with the calculated concentration of SE in water, $FPD_{SE}$, the table in FIG. 1 is used.

After the $FPD_{SE}$ has been determined, the contribution to the freezing point depression from salts in NMS and WS is then calculated using the following equation:

$$FPD_{SA}=((NMS+WS) \times 2.37)/W$$

This equation calculates the freezing point depression for salts (° C.) contained in NMS and WS and the constant 2.37 is based on the average molecular weight and concentration of the salts present in milk. To obtain the freezing point depression of the ice cream mix, $FPD_T$, the two contributions are added together.

$$FPD_T=FPD_{SE}+FPD_{SA}$$

For example, the freezing point of an ice cream mix containing 10% NMS, 2% whey solids, 12% sucrose, 4% 42 DE CSS, and 60% water (40% total solids) is calculated as follows:

First, calculate the sucrose equivalents:

$$SE=(10 \times 0.545)+(2 \times 0.765)+12+(4 \times 0.8)=22.18$$

The equivalent concentration of sucrose in water is:

$$g\ sucrose/100\ g\ water=22.18 \times 100/60=36.97$$

Referring to the table in FIG. 1 and by interpolation, the freezing point for the level of sucrose equivalent, $FPD_{SE}$, is 2.27°. Next, the freezing point depression for salts has to be determined. For salts:

$$FPD_{SA}=((10+2) \times 2.37)/60=0.47°$$

Thus, the total freezing point depression for the mix is:

$$FPD_T=FPD_{SE}+FPD_{SA}=2.27°+0.47°=2.74°$$

The table in FIG. 1, along with the freezing point depression calculations, have been taken from Marshall, Robert T., H. Douglas Goff, and Richard W. Hartel. *Ice Cream*. 6th ed. New York: Springer, 2003. Print.

Alcohol Containing Products

Most ice cream and other frozen dessert products have little if any alcohol present. While alcoholic beverages are also popular, the extremely low freezing point of alcohol makes alcohol difficult to use in a frozen product that can be stored in a conventional freezer. Ethanol, the alcohol used in alcoholic beverages, has a melting point of −114° C. (−173° F.). This is one reason many thermometers use an alcohol containing material. Even at low temperatures the alcohol remains an unfrozen liquid and the thermometer can be used in most physical environments on earth. Water freezes as 0° C. (32° F.) and the coldest home freezers typically will not go below about −18° C. Because of its low freezing temperatures, an alcohol containing product is very difficult to freeze and keep frozen.

Most alcoholic based products such as scotch, rye, rum, vodka, etc., are not pure ethanol. Alcohol containing products such as rye, scotch, gin, rum, etc. identify the percentage of alcohol by the description "proof." Thus a 100 proof product is 50% alcohol. Many hard liquors are 40 proof or higher but not usually greater than 100 proof. Beer and wine typically have a much lower percentage of alcohol, usually well under 20%. Notably, the highest percentage ingredient in a liquor, beer, or wine is water.

Because most alcohol containing beverages contain a significant amount of water, the freezing point for these beverages is not as low as for pure alcohol. As little as 1% alcohol in water will lower the freezing point of water. As a result, a higher concentration of alcohol, will lead to a lower freezing point. Thus, for example, 1% alcohol in water will have a freezing point of slightly less than 0° C. Ninety-five percent alcohol will freeze fairly close to −114° C.

Although alcohol lowers the freezing temperature of water, the two liquids do not freeze in unison. As the water in a water alcohol mixture begins to freeze, the water soluble alcohol forms hydrogen bonds with the water. The presence of the alcohol/water hydrogen bonds interferes with the structure of the lattice formed by ice thereby depressing the water's freezing point. As the water temperature is reduced, alcohol is forced out of the lattice formed by freezing ice just as salts and other solutes are. This property of water-alcohol mixes has been used to increase the alcohol content of some fermented beverages. For example, partially freezing hard cider and straining off the ice crystals leaves behind a more potent residue call "apple jack." This process is called fractional freezing.

One type of alcohol containing dessert product that has been available for a number of years has been a gelatin based alcohol containing product. One colloquial identification for such a product is a "Jello shot" which is made from a gelatin based product where alcohol is used as a solvent. The gelatin forms a semisolid gel complex as it solidifies, encapsulating the alcohol contained therein. A Jello shot type product however is a gel and not considered a frozen dessert product.

Thus, there has not yet been an alcohol containing bulk frozen dessert product that, as in the present invention, incorporates alcohol in more than trace amounts. One of the problems with attempting to make such a product is the lower storage temperatures required to keep the product frozen. Alcohol containing products typically need to be frozen at lower temperatures than non-alcohol containing frozen products. In addition, they typically need to be stored at significantly lower temperatures.

Other issues in adding alcohol to a frozen dessert type product also exist. For example, when adding alcohol to frozen dessert mixes:
a) alcohol depresses the freezing point and therefore raises storage, shipping and shelf life issues;
b) alcohol vaporizes in the presence of air, making shelf life an issue—this phenomenon is not unlike leaving a bottle of wine or spirits open over time where the alcohol content dissipates; and
c) alcohol cannot be added before pasteurization/stabilization as the alcohol will be destroyed by the heat of the process, and render the product alcohol free.

OBJECTS OF THE INVENTION

It is an object of the invention to provide an alcohol containing bulk frozen dessert product that may be stored in conventional ice cream storage equipment.

It is another object of the invention to provide an alcohol containing ice cream mix that will form into a triple phase bulk frozen dessert product that may be stored for significant periods of time as a triple phase bulk product at temperatures as high as −18.0° C.

It is a further object of the invention to produce a bulk frozen dessert product that would approximate the composition of a mixed alcoholic drink.

It is also a further object of the invention to produce a bulk frozen dessert product that would approximate the taste of a mixed alcoholic drink.

It is still a further object of the invention to provide a bulk frozen dessert product mix that may be used to form an alcohol containing bulk frozen dessert product.

It is an even further object of the invention to form an alcohol containing frozen dessert product.

SUMMARY OF THE INVENTION

The difficulty of producing an alcohol containing bulk frozen dessert product is solved by the present invention. The present invention is directed to a method for making an alcohol containing bulk frozen dessert product that contains an alcohol concentration of from about 2% to about 18% and that can be stored and transported in conventional freezer equipment used for traditional ice cream products rather than specialized storage equipment for low temperature storage. Preferably the alcohol concentration is in the range of about 3% to about 12%. More preferably, the alcohol concentration is in the range of 3% to about 10% and most preferably 5% to about 8%.

The present invention is directed to an alcohol containing bulk frozen dessert product that can be prepared using the existing storage and handling facilities that are currently used for non-alcohol containing bulk frozen dessert products. In order to achieve this, a unique product mix has been developed that produces an alcohol containing frozen dessert product that has the following characteristics:

1. The product has a serving temperature of from about −6° C. to about −14° C.;
2. The product softens on melting but does not melt completely;
3. The alcohol does not separate out from the softened ice cream while said ice cream has three phases namely gas, liquid and solid present;
4. The product has a storing temperature of from about −18° C. to about −25° C.; and
5. The product has a freezing point of from about −2.0° C. to about −8.0° C.

The product of the present invention is achieved by adding an alcohol containing composition to the frozen dessert product mix after the frozen dessert product mix has been pasteurized but before the product has been aged, flavored, and then frozen. The alcohol containing composition may include an alcohol, a water based mixer, and one or more stabilizers and/or emulsifiers that have been added to the pasteurized frozen dessert product mix. The frozen dessert product mix, as it enters the pasteurization phase preferably does not have any added stabilizers and/or emulsifiers over and above what is already in the base. In other embodiments, the frozen dessert product may have stabilizers and/or emulsifiers present before the pasteurization process. Additional stabilizers and/or emulsifiers may be added after the pasteurization of the frozen dessert product mix.

The teachings of the present invention can be used in dairy frozen desserts such as ice cream, frozen yogurt, sorbet, gelato, etc., as well as nondairy frozen desserts.

For alcohol based frozen dessert products the sucrose equivalent calculation set forth above has to be modified. This formula is as follows:

$$SE=(NMS \times 0.545)+(WS \times 0.765)+S+(10DE\ CSS \times 0.2)+(36DE\ CSS \times 0.6)+(42DE\ CSS \times 0.8)+(62DE\ CSS \times 1.2)+(HFCS \times 1.8)+(F \times 1.9)+(A \times 5.64^*)$$

where:
NMS=nonfat milk solids, 0.545 is the percentage of lactose typical of NMS;
WS=whey solids (from dry or condensed whey), 0.765 is the percentage of lactose typically found in whey solids;
S=sucrose or other disaccharides such as lactose or maltose added directly;
DE=dextrose equivalent of the CSS (corn syrup solids);
HFCS=high fructose corn syrup;
F=pure fructose or other pure monosaccharides such as dextrose; all in g/100 g mix (or %).
A=ALCOHOL in grams
*3-9% ALCOHOL=(A×5.64)
10-18% ALCOHOL=(A×8.53)

In one embodiment the Sucrose Equivalent is in the range of about 10 to about 35. In a preferred embodiment the Sucrose Equivalent is in the range of about 12 to about 28. In a more preferred embodiment the Sucrose Equivalent is in the range of about 15 to about 25.

When adding alcohol to frozen dessert mixes, the above formula does not resolve all of the issues with adding alcohol because there is a risk that the sugar content could be reduced below a desirable taste threshold when using the above formula. It may be necessary to employ a sugar substitute like Splenda (artificial) or stevia (natural) to affect sweetness without affecting FPD (Freezing Point Depression). In addition, it may be necessary to reduce overrun (ideally under 30%) to reduce the number and size of air bubbles in the frozen product. Commercial frozen ice cream products typically have a quantity of air added to the mix. In fact an ice cream mix can have 50% air present in the mix. In such situations, one gallon of mix becomes two gallons of ice cream because of the air added. This additional increase in volume is called overrun. This air can cause the alcohol to vaporize over time. In order to reduce the size and number of bubbles in the frozen product the overrun is reduced to about 20 to 30% from commercial ice cream's typical 100% overrun. It is also desirable to seal all packages with air tight seals to prevent migration of outside air and subsequent vaporization and to stabilize the alcohol separately, before incorporating it into the ice cream mix, using stabilizers that do not require heat for hydration

DETAILED DESCRIPTION OF THE INVENTION

The present invention is directed to improved compositions that may be used in forming an alcohol containing frozen dessert product wherein the alcohol content in the bulk frozen dessert product is from about 2% to about 18%. Frozen dessert products, such as ice cream, sorbet, sherbet, water ice, ice milk, or frozen yogurt, are traditionally made by mixing all of the ingredients followed by pasteurization, homogenizing, aging, packaging, and then freezing and flavoring. Deviating from this traditional procedure, the present invention produces an alcohol containing bulk frozen dessert product by adding an alcohol along with stabilizers and/or emulsifiers after the traditional frozen product mix has been pasteurized to produce an alcohol containing frozen dessert product mix that has an alcohol content from about 2% to about 15%. The alcohol and stabilizers and/or emulsifiers are added to the mix after the pasteurization step because it permits the alcohol to be blended into the mix homogeneously but before it has been frozen. Furthermore, the alcohol would burn off while subjected to the heat of the pasteurization process, which would reduce the overall percentage of alcohol below the desired percentage. In a preferred embodiment, the alcohol and stabilizers and/or emulsifiers are added in the form of an alcohol containing composition to the frozen dessert product mix after the mix has undergone pasteurization to form an alcohol containing frozen dessert product mix. Next, the new alcohol containing mix is aged, flavored, and frozen in the same way as traditional frozen dessert product mixes. This process will produce an alcohol containing bulk frozen dessert product that has the same freezing properties and characteristics as a traditional bulk frozen dessert product.

The alcohol containing composition that is added to the frozen dessert product mix preferably includes alcohol, a water based mixer, and a stabilizer and/or emulsifier. The stabilizer and/or emulsifier should be one that does not require heat for hydration. In addition, the alcohol containing composition is added to the traditional frozen dessert product mix after the traditional mix has undergone pasteurization. Alternatively, the alcohol containing composition may only be comprised of an alcohol or a water based alcohol containing mixer and a stabilizer and/or emulsifier. A stabilizer and/or emulsifier is added with the alcohol because alcohol is known to separate from water and therefore needs a stabilizer and/or emulsifier to help it blend better with the mix and prevent the alcohol and water from separating.

In a further embodiment, rather than adding a pre-blended alcohol containing composition to the post-pasteurization frozen dessert product mix, an alcohol, and stabilizers and/or emulsifiers may be added as separate ingredients to the post pasteurization mix. A water based mixer may also be added as another separate ingredient in conjunction with the alcohol and stabilizers and/or emulsifiers. Alternatively, two out of any of the three ingredients may be blended and added as a separate ingredient from the other non-blended ingredient.

The term alcohol, as used herein, can be either pure ethyl alcohol or the blend of ethyl alcohol, water, and/or other flavors. For example, the alcohol containing product can be a mixed drink, having an alcohol and a water based mixer. Suitable alcohol containing products include but are not limited to scotch, rye, vodka, gin, rum, whiskey, etc. Alcohol containing beverages include, but are not limited to, gin and tonic, rum and Coke, scotch and soda, rye and ginger, margaritas, Tom Collins, etc. The product of the present invention may also include beer, wine, and liqueurs.

The term alcohol content, as used herein, refers to the actual percentage of ethyl alcohol that is present in the frozen dessert product and not the actual percentage of the alcohol containing product. For example, a 100 ml solution that contains 5 ml of a 100 proof alcohol containing product will only have a 2.5% alcohol content because only half, 2.5 ml, of the 5 ml is actually ethyl alcohol.

The water based mixer may be any of a number of substances. For example, it can be water, a diet soda, or a club soda. The mixer could also be a vegetable or fruit puree. The water based mixer may be present in an amount of at least 60% or more by volume.

The stabilizer used in the present invention may include, but is not limited to, guar gum, sodium alginate, carob, agar, farina-de carob, farina-de guar, xantham gum, carrageenan, and sodium carboxymethylcellulose. However, a stabilizer that needs to be heated in order to function, such as a gel based stabilizer or other stabilizer or emulsifier that needs to be heated, should not be used after pasteurization of the mix when the alcohol is added to the mix. The stabilizer is used to provide solid content and binding capabilities to the composition. It also helps to prevent the alcohol and water from separating as the temperature of the composition is lowered during freezing.

The emulsifiers used in the present invention may include but are not limited to mono- and diglycerides from soy and polysorbate 80. The emulsifiers help reduce fat globule coalescence by decreasing the interfacial tension between the fat and the matrix within the ice cream mixture.

A traditional frozen dessert product pre-mix that does not contain alcohol may consist of from about 1% to about 20% milkfat, from about 6% to about 18% NMS, from about 2% to about 16% sugar (including from about 12% to about 20% of which is sucrose), from about 0.2% to about 1.0% of a stabilizer and/or emulsifier blend, and up to about 65% water. However, if you want to add alcohol, you will have to revise the formula and reduce the amount of sugar, since sugar, like alcohol, has a depressing affect on the freezing point of the mix. Therefore, the frozen dessert product mix before the alcohol and stabilizers and/or emulsifiers are added may consist of about 0% to about 15% milkfat, from about 1% to about 15% NMS, from about 2% to about 15% sugar (including from about 50% to about 100% of which is sucrose), from about 0.1% to about 0.5% of a stabilizer and/or emulsifier blend, and up to about 68% water. After the alcohol and stabilizers and/or emulsifiers are added, the mix may consist of about 0% to about 12% milkfat, from about 1% to about 12% NMS, from about 2% to about 12% sugar (including from about 50% to about 100% of which is sucrose), from about 0.2% to about 0.5% of a stabilizer and/or emulsifier blend, from about 2% to about 18% alcohol, and up to about 63% water. Preferably the alcohol concentration is in the range of about 3% to about 12%. More preferably, the alcohol concentration is in the range of 3% to about 10% and most preferably 5% to about 8%.

The range of sugar in the alcohol containing frozen dessert product of the present invention is from about 2% sugar to about 15% sugar. A preferred range of sugar content is from about 2% sugar to about 13% sugar. A more preferred range of the sugar content in the frozen dessert product is from about 3% sugar to about 12% sugar. A most preferred range is from about 4% sugar to about 12% sugar.

The concentration of alcohol in the alcohol containing frozen dessert product of the present invention is from about 2% to about 18% alcohol. A preferred range of the alcohol concentration in the frozen product is from about 3% alcohol to about 10%. Another range of the alcohol concentration is from about 4% alcohol to about 8% alcohol. A still further range is from about 5% alcohol to about 7% alcohol.

What is claimed is:

1. A method of forming an alcohol-containing bulk frozen dessert product containing from about 10% to about 18% alcohol, which can be stored and transported in existing freezer equipment used for ice cream products, said method comprising the steps of:
    a) forming a frozen dessert product mix comprising about 0% to about 15% of milkfat; from about 1% to about 15% of nonfat milk solids; from about 2% to about 4% of sugar, wherein about 50% to about 100% of said sugar is sucrose; from about 0.1% to about 0.5% of a stabilizer and/or emulsifier blend, and up to about 68% water;
    b) pasteurizing said frozen dessert product mix;
    c) after the pasteurizing of step b), blending said frozen dessert product mix with an alcohol-containing composition to form a homogenously blended alcohol-containing product mix, said alcohol-containing composition comprising alcohol and at least one stabilizer and at least one emulsifier,
    wherein said at least one stabilizer and said at least one emulsifier do not require heat for hydration and blend the alcohol better with the frozen dessert product mix to prevent separation; and then
    d) aging, flavoring, and freezing said alcohol-containing product mix to form said alcohol-containing bulk frozen dessert product;
    wherein said alcohol-containing bulk frozen dessert product contains from about 10% to about 18% alcohol and has a freezing point from about −2° C. to about −8° C.;
    wherein the alcohol-containing bulk frozen dessert product comprises an amount of at least one artificial or natural sweetener that provides sufficient sweetness and taste, while maintaining said freezing point between about −2° C. to about −8° C.; and
    wherein said alcohol-containing bulk frozen dessert product is ice cream, sorbet, sherbet, ice milk, gelato, or frozen yogurt.

2. The method according to claim 1, wherein said alcohol-containing composition further comprises a water-based mixer, said water-based mixer including water.

3. The method according to claim 1, wherein said at least one stabilizer present in said alcohol-containing composition is guar gum.

4. The method according to claim 3, wherein said at least one emulsifier present in said alcohol-containing composition is polysorbate 80.

5. The method according to claim 1, wherein the alcohol-containing composition is a pre-blended composition of a water-based mixer, said at least one stabilizer, said at least one emulsifier and the alcohol.

6. The method according to claim 2, wherein said water-based mixer is soda.

7. The method according to claim 2, wherein said water-based mixer is a vegetable or fruit puree.

8. The method according to claim 1, wherein said alcohol is scotch.

9. The method according to claim 1, wherein said alcohol is vodka.

10. The method according to claim 1, wherein said alcohol is whiskey.

11. The method according to claim 8, wherein said at least one stabilizer present in said alcohol-containing composition is sodium alginate.

12. The method according to claim 8, wherein said at least one stabilizer present in said alcohol-containing composition is carob.

13. The method according to claim 8, wherein said at least one stabilizer present in said alcohol-containing composition is agar.

14. The method according to claim 11, wherein said at least one emulsifier present in said alcohol-containing composition is at least one monoglyceride and/or at least one diglyceride derived from soy.

15. The method according to claim 1, wherein said alcohol-containing bulk frozen dessert product is a dairy frozen dessert product.

16. The method according to claim 1, wherein said alcohol-containing bulk frozen dessert product is a non-dairy frozen dessert product.

17. The method according to claim 1, wherein said alcohol-containing bulk frozen dessert product has three phases, said three phrases being a gas phase, a solid phase, and a liquid phase, said alcohol-containing bulk frozen dessert product has a serving temperature of from about −6° C. to about −14° C., said alcohol-containing bulk frozen dessert product softens on melting but does not melt completely and said alcohol-containing bulk frozen dessert product has a storing temperature of from about −18° C. to about −25° C.

18. The method according to claim 1, wherein said alcohol-containing product mix comprises about 0% to about 12% of said milkfat, from about 1% to about 12% of said nonfat milk solids, from about 2% to about 4% of said sugar, wherein about 50% to about 100% of said sugar is sucrose, from about 0.2% to about 0.5% of said stabilizer and/or emulsifier blend, from about 10% to about 18% of said alcohol, and up to about 63% of said water.

19. The method according to claim 1, wherein said frozen dessert product mix is composed, so that the alcohol-containing bulk frozen dessert product is an ice cream.

20. The method according to claim 1, wherein the alcohol-containing bulk frozen dessert product has a sucrose equivalence (SE) in a range of from about 10 to about 35 in grams per 100 grams of the bulk frozen dessert product and said sucrose equivalent of the bulk frozen dessert product is calculated according to the formula:

$$SE=(NMS\times0.545)+(WS\times0.765)+S+(10DE\ CSS\times0.2)+(36DE\ CSS\times0.6)+(42DE\ CSS\times0.8)+(62DE\ CSS\times1.2)+(HFCS\times1.8)+(F\times1.9)+(A\times8.53) \quad (II);$$

wherein
NMS =the amount of nonfat milk solids;
WS =the amount of whey solids from dry or condensed whey;
S =the amount of sucrose or other disaccharides added directly;
DE CSS =dextrose equivalence of the amount of corn syrup solids (CSS);
HFCS =the amount of high fructose corn syrup;
F =the amount of pure fructose or other pure monosaccharides;
A =the amount of alcohol;
wherein the amounts of the ingredients listed above including the alcohol are expressed in grams per 100 grams or as a percentage of the alcohol-containing bulk frozen dessert product.

21. The method according to claim 20, wherein the sucrose equivalence is from about 12 to about 28 in grams per 100 g of the product.

22. The method according to claim 21, wherein the sucrose equivalence is from about 15 to about 25 in grams per 100 g of the product.

23. The method according to claim 20, further comprising adding air to said alcohol-containing product mix during said freezing so that an overrun or volume increase in said alcohol-containing bulk frozen dessert product due to incorporation of said air is limited to 20 to 30% by volume.

24. The method according to claim 1, wherein the artificial sweetener comprises sucralose and the natural sweetener comprises steviol glycosides.

25. A method of forming an alcohol-containing bulk ice cream product containing from about 10% to about 18% alcohol, which can be stored and transported in existing freezer equipment used for ice cream products, said method comprising the steps of:

a) forming a frozen dessert product mix comprising from about 12% to about 15% of milkfat; from about 11% to about 15% of nonfat milk solids; from about 2% to about 4% of sugar, wherein about 50% to about 100% of said sugar is sucrose; from about 0.3% to about 0.5% of a stabilizer and/or emulsifier blend, and up to about 61.7% water;

b) pasteurizing said frozen dessert product mix;

c) after the pasteurizing of step b), blending said frozen dessert product mix with an alcohol-containing composition to form a homogenously blended alcohol-containing product mix, said alcohol-containing composition comprising alcohol and at least one stabilizer and at least one emulsifier, said at least one stabilizer being selected from the group consisting of sodium alginate and agar, and said at least one emulsifier being selected from the group consisting of monoglycerides derived from soy and diglycerides derived from soy; and then d) aging, flavoring, freezing, and adding air to said alcohol-containing product mix during said freezing to form said alcohol-containing bulk ice cream product with an overrun or increase in volume due to incorporation of said air limited to from 20 to 30% by volume;

wherein said alcohol-containing bulk ice cream product has three phases, said three phrases being a gas phase, a solid phase, and a liquid phase; said alcohol-containing bulk ice cream product has a freezing point from about −2° C. to about −8° C.; said alcohol-containing bulk ice cream product has a serving temperature of from about −6° C. to about −14° C.; said alcohol-containing bulk ice cream product softens on melting but does not melt completely and said alcohol-containing bulk ice cream product has a storing temperature of from about −18° C. to about −25° C.;

and the alcohol-containing bulk ice cream product comprises an amount of at least one artificial or natural sweetener that provides sufficient sweetness and taste, while maintaining said freezing point between about −2° C. to about −8° C.

26. The method according to claim 25, wherein the artificial sweetener comprises sucralose and the natural sweetener comprises steviol glycosides.

\* \* \* \* \*